US 8,174,986 B2

(12) United States Patent
Harris

(10) Patent No.: US 8,174,986 B2
(45) Date of Patent: May 8, 2012

(54) METHOD AND APPARATUS FOR PERFORMING ROUTING AREA UPDATES

(75) Inventor: John M. Harris, Glenview, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 421 days.

(21) Appl. No.: 12/396,654

(22) Filed: Mar. 3, 2009

(65) Prior Publication Data

US 2009/0252103 A1    Oct. 8, 2009

Related U.S. Application Data

(60) Provisional application No. 61/042,282, filed on Apr. 4, 2008.

(51) Int. Cl.
*H04J 1/16* (2006.01)
(52) U.S. Cl. .................. 370/236; 370/238; 370/392
(58) Field of Classification Search .............. 370/331, 370/236, 238, 392, 356, 355
See application file for complete search history.

(56) References Cited

U.S. PATENT DOCUMENTS

| | | | | |
|---|---|---|---|---|
| 5,361,396 A | * | 11/1994 | Onoe et al. | 455/435.1 |
| 6,731,936 B2 | * | 5/2004 | Chen et al. | 455/437 |
| 6,859,653 B1 | | 2/2005 | Ayoub et al. | |
| 7,161,929 B1 | * | 1/2007 | O'Neill et al. | 370/349 |
| 7,450,975 B2 | | 11/2008 | Harris | |
| 7,643,834 B2 | | 1/2010 | Ioppe et al. | |
| 7,864,755 B2 | * | 1/2011 | Takahashi et al. | 370/356 |
| 2007/0202879 A1 | * | 8/2007 | Bae et al. | 455/436 |
| 2007/0293157 A1 | | 12/2007 | Haartsen et al. | |

OTHER PUBLICATIONS

Aydin et al.; ( "QoS Mobility-Aware Algorithm using Early Update for Host Identity protocol"); 2010; IEEE; pp. 2014-2018.*
Gurkas Aydin, Z. et al.: "QoS Mobility-Aware Algorithm Using Early Update for Host Identity Protocol", Personal Indoor and Mobile Radio Communications (PIMRC), 2010 IEEE 21st International Symposium, Sep. 26-30, 2010, all pages.

* cited by examiner

*Primary Examiner* — Ricky Ngo
*Assistant Examiner* — Dewanda Samuel

(57) ABSTRACT

Various embodiments are described for potentially reducing the impact of routing area updates on wireless system capacity. Logic flow diagram 10, in FIG. 1, depicts such functionality. In some embodiments, it is determined (12) whether a remote unit is within an edge portion of a routing area, while in other embodiments it is determined (12) whether the remote unit is within an end portion of a routing area update interval. It is also determined (14) whether one or more conditions are present for the remote unit to perform a resource-efficient routing update. A routing area update is then performed (16) when one or more of the conditions are present and when, depending on the embodiment, either the remote unit is determined to be within the edge portion of the routing area or the remote unit is determined to be within the end portion of the routing area update interval.

10 Claims, 3 Drawing Sheets

METHOD AND APPARATUS FOR PERFORMING ROUTING AREA UPDATES

REFERENCE(S) TO RELATED APPLICATION(S)

The present application claims priority from a provisional application, Ser. No. 61/042,292, entitled "METHOD AND APPARATUS FOR PERFORMING ROUTING AREA UPDATES," filed Apr. 4, 2008, which is commonly owned and incorporated herein by reference in its entirety.

FIELD OF THE INVENTION

The present invention relates generally to wireless communication and, in particular, to performing routing area updates in wireless communication systems.

BACKGROUND OF THE INVENTION

In wireless interfaces such as those based on the IEEE (Institute of Electrical and Electronics Engineers) 802.16 air interface, mobile devices perform routing area updates after detecting that they have exited their respective paging areas. In other technologies, a mobile may perform a routing area update (or registration) when it detects that the location of its current network node is greater than a particular distance from the network node with which it last performed a routing area update/registration (e.g., when it moves into a cell which is more than a requisite registration distance from its last known cell) or when it enters a new cell in a new paging area. Often a mobile device will be located at the edge of a cell when it discovers that it has entered a new paging area (or has moved its requisite registration distance) and then performs its routing area update. However, in general, signaling while near the edge of a coverage area requires a greater portion of the available signaling capacity and battery life than does signaling while located more centrally within the coverage area. Routing area updates/registrations may therefore adversely impact wireless capacity. Thus, new techniques able to reduce the impact of routing area updates on system capacity would be desirable.

Figure 1:
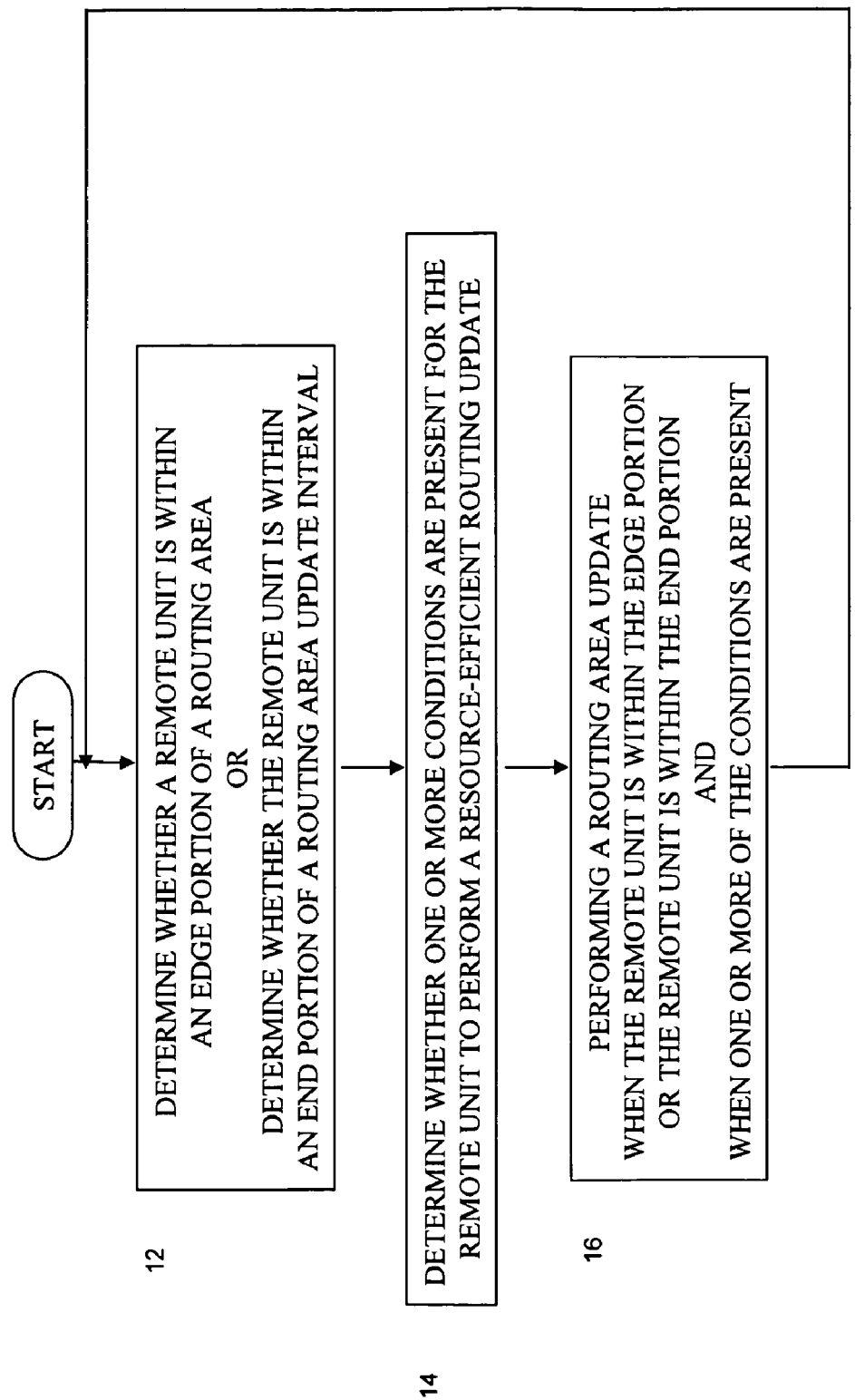
FIG. 1 is a logic flow diagram of functionality performed in a wireless communication system in accordance with multiple embodiments of the present invention.

Specific embodiments of the present invention are disclosed below with reference to FIGS. 1-3. Both the description and the illustrations have been drafted with the intent to enhance understanding. For example, the dimensions of some of the figure elements may be exaggerated relative to other elements, and well-known elements that are beneficial or even necessary to a commercially successful implementation may not be depicted so that a less obstructed and a more clear presentation of embodiments may be achieved. In addition, although the signaling flow diagrams and/or the logic flow diagrams above are described and shown with reference to specific signaling exchanged and/or specific functionality performed in a specific order, some of the signaling/functionality may be omitted or some of the signaling/functionality may be combined, sub-divided, or reordered without departing from the scope of the claims. Thus, unless specifically indicated, the order and grouping of the signaling/functionality depicted is not a limitation of other embodiments that may lie within the scope of the claims.

Simplicity and clarity in both illustration and description are sought to effectively enable a person of skill in the art to make, use, and best practice the present invention in view of what is already known in the art. One of skill in the art will appreciate that various modifications and changes may be made to the specific embodiments described below without departing from the spirit and scope of the present invention. Thus, the specification and drawings are to be regarded as illustrative and exemplary rather than restrictive or all-encompassing, and all such modifications to the specific embodiments described below are intended to be included within the scope of the present invention.

DETAILED DESCRIPTION OF EMBODIMENTS

Various embodiments are described for potentially reducing the impact of routing area updates on wireless system capacity. Logic flow diagram 10, in FIG. 1, depicts functionality performed in accordance with multiple embodiments of the present invention. In some embodiments, it is determined (12) whether a remote unit is within an edge portion of a routing area, while in other embodiments it is determined (12) whether the remote unit is within an end portion of a routing area update interval. It is also determined (14) whether one or more conditions are present for the remote unit to perform a resource-efficient routing update. A routing area update is then performed (16) when one or more of the conditions are present and when, depending on the embodiment, either the remote unit is determined to be within the edge portion of the routing area or the remote unit is determined to be within the end portion of the routing area update interval.

Thus, embodiments are described to enable routing area updates to be performed opportunistically. By performing them when a more resource-efficient condition is present, wireless system capacity may be saved as compared to present-day system operation in which routing area updates are often performed in conditions that are more resource demanding, i.e., from a coverage area edge.

Figure 2:
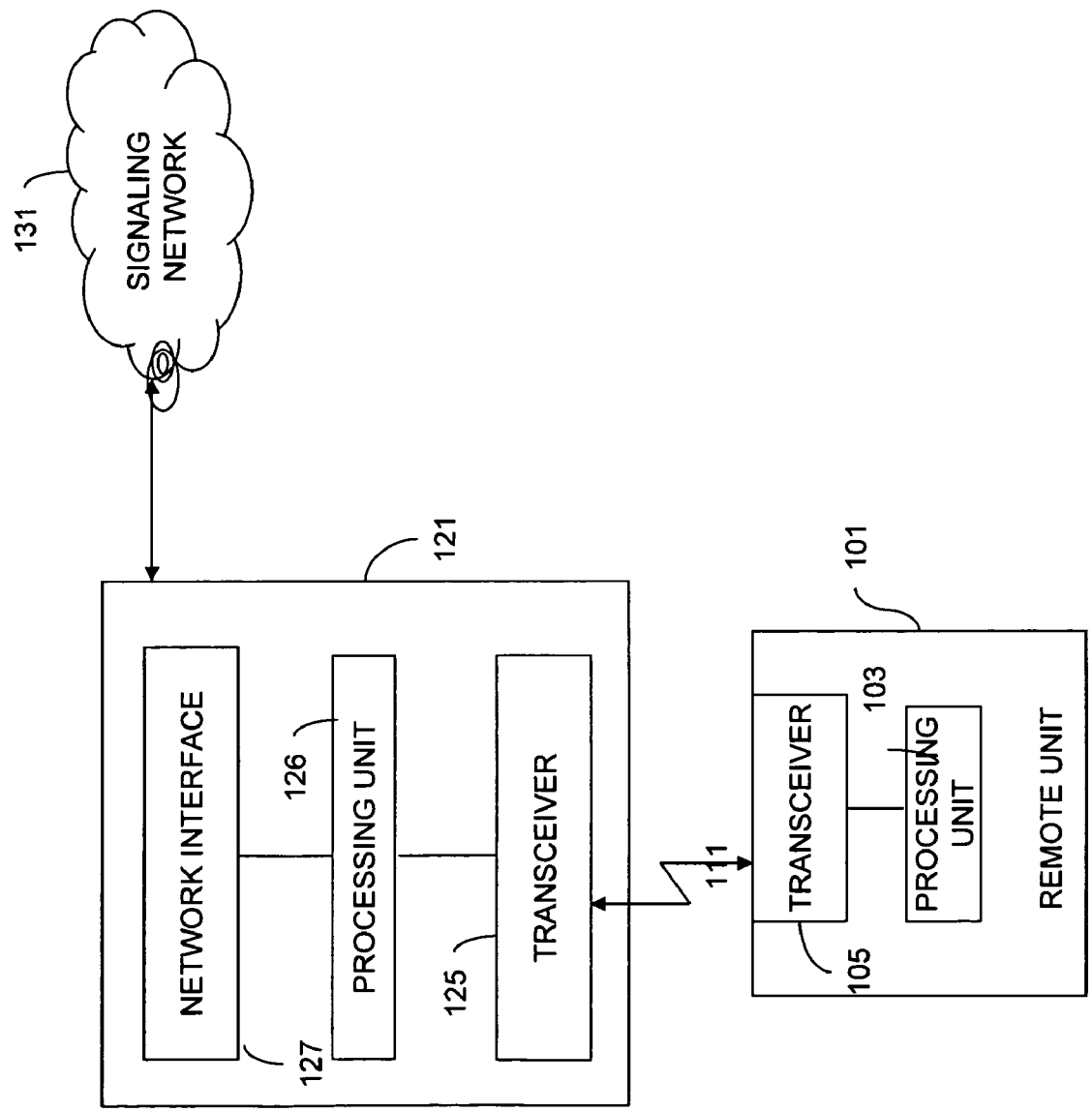
FIG. 2 is a block diagram depiction of a wireless communication system in accordance with multiple embodiments of the present invention.
Figure 3:
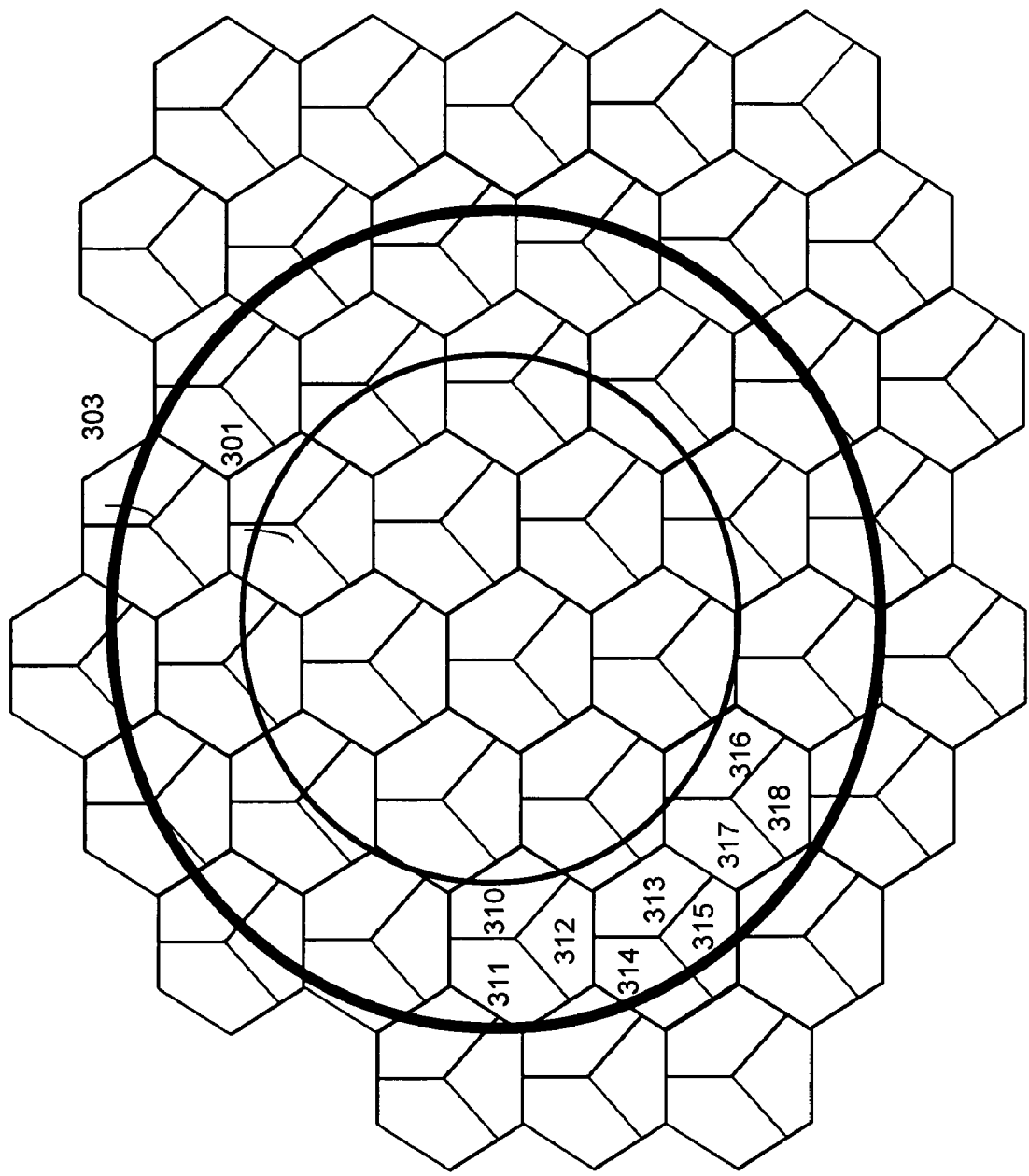
FIG. 3 is a diagram depicting wireless coverage areas and routing area update regions for use in illustrating multiple embodiments of the present invention.

The disclosed embodiments can be more fully understood with reference now to FIGS. 1-3. FIG. 2 is a block diagram depiction of a wireless communication system 100 in accordance with multiple embodiments of the present invention. At present, standards bodies such as OMA (Open Mobile Alliance), 3GPP (3rd Generation Partnership Project), 3GPP2 (3rd Generation Partnership Project 2), IEEE (Institute of Electrical and Electronics Engineers) 802, and WiMAX Forum are developing standards specifications for wireless telecommunications systems. (These groups may be contacted via http://www.openmobilealliance.com, http://www.3gpp.org/, http://www.3gpp2.com/, http://www.ieee802.org/, and http://www.wimaxforum.org/ respectively.) Communication system 100 represents a system having an architecture in accordance with one or more of the WiMAX Forum and/or IEEE 802 technologies, suitably modified to implement the present invention. Alternative embodiments of the present invention may be implemented in communication systems that employ other or additional technologies such as, but not limited to, those described in the OMA, 3GPP, and/or 3GPP2 specifications.

Communication system 100 is depicted in a very generalized manner. For example, system 100 is shown to simply include remote unit 101, network node 121 and signaling network 131. Network node 121 is shown having interconnectivity via signaling network 131. Network node 121 is shown providing network service to remote unit 101 using wireless interface 111. The wireless interface used is in accordance with the particular access technology supported by network node 121, such as one based on IEEE 802.16. Those skilled in the art will recognize that FIG. 3 does not depict all of the physical fixed network components that may be necessary for system 100 to operate but only those system components and logical entities particularly relevant to the description of embodiments herein.

As depicted in FIG. 2, network node 121 comprises a processing unit 126, a network interface 127 and a transceiver 125. In general, components such as processing units, transceivers and network interfaces are well-known. For example, processing units are known to comprise basic components such as, but neither limited to nor necessarily requiring, microprocessors, microcontrollers, memory devices, application-specific integrated circuits (ASICs), and/or logic circuitry. Such components are typically adapted to implement algorithms and/or protocols that have been expressed using high-level design languages or descriptions, expressed using computer instructions, expressed using signaling flow diagrams, and/or expressed using logic flow diagrams.

Thus, given a high-level description, an algorithm, a logic flow, a messaging/signaling flow, and/or a protocol specification, those skilled in the art are aware of the many design and development techniques available to implement a processing unit that performs the given logic. Therefore, device 121 represents a known device that has been adapted, in accordance with the description herein, to implement multiple embodiments of the present invention. Furthermore, those skilled in the art will recognize that aspects of the present invention may be implemented in or across various physical components and none are necessarily limited to single platform implementations. For example, a network node may be implemented in or across one or more RAN components, such as a base transceiver station (BTS) and/or a base station controller (BSC), a Node-B and/or a radio network controller (RNC), or an HRPD AN and/or PCF, or implemented in or across one or more access network (AN) components, such as an access service network (ASN) gateway and/or ASN base station (BS), an access point (AP), a wideband base station (WBS), and/or a WLAN (wireless local area network) station.

Remote unit 101 and network node 121 are shown communicating via technology-dependent, wireless interface 111. Remote units, subscriber stations (SSs) and/or user equipment (UEs), may be thought of as mobile stations (MSs), mobile subscriber stations (MSSs), mobile devices or mobile nodes (MNs). In addition, remote unit platforms are known to refer to a wide variety of consumer electronic platforms such as, but not limited to, mobile stations (MSs), access terminals (ATs), terminal equipment, mobile devices, gaming devices, personal computers, and personal digital assistants (PDAs). In particular, remote unit 101 comprises a processing unit (103) and transceiver (105). Depending on the embodiment, remote unit 101 may additionally comprise a keypad (not shown), a speaker (not shown), a microphone (not shown), and a display (not shown). Processing units, transceivers, keypads, speakers, microphones, and displays as used in remote units are all well-known in the art.

Operation of embodiments in accordance with the present invention occurs substantially as follows, first with reference to FIGS. 2 and 3. Numerous embodiments of the present invention are anticipated. A sampling of these embodiments will be described by way of example in the following description. One reason for such a large number of embodiments is that registrations or routing area updates may be triggered in a variety of different ways. For example, in some systems routing area updates may be triggered when a remote unit moves a certain geographical distance from its last update. (Of course, this geographical distance may be determined based on a variety of different techniques.) In some systems, routing area updates may be triggered after a certain period of time elapses since the last update or based on some combination of time and distance.

Thus, depending on the embodiment, remote unit processing unit 103 may determine whether remote unit 101 is within an edge portion of a routing area or it may determine whether remote unit 101 is within an end portion of a routing area update interval. In other words, remote unit 101 may determine whether it is nearing a distance or location-based trigger or a time-based trigger for performing a routing area update. FIG. 3 provides an illustration for some of the distance or location-based cases. Diagram 300 depicts wireless coverage areas and routing area update regions in an example wireless system.

To illustrate some of the embodiments, we will assume that remote unit 101 last performed a routing area update at the center of circles 301 and 303 and that upon leaving the region enclosed by circle 303, remote unit 101 is required to perform a routing area update. The region enclosed by circle 303 but not within circle 301 will be considered to be the edge portion of a routing area defined by circle 303. Thus, remote unit 101 may determine whether it is within this edge portion.

Processing unit 103 may then perform a routing area update via transceiver 105 when remote unit 101 is determined to be within the edge portion or determined to be within the end portion of its routing area update interval and when at least one condition is present for remote unit 101 to perform a resource-efficient routing update. In other words, remote unit 101 may perform a routing area update before it would otherwise be required to if a condition is present for performing it in a resource-efficient manner.

Depending on the embodiment, processing unit 103 may determine whether a condition is present to perform a resource-efficient routing update in many different ways. Some or all of the following examples may be employed in a particular embodiment. For example, processing unit 103 may receive signaling, from network node 121 via transceiver 105, having a signal strength greater than a threshold signal strength value. As an example, a resource-efficient routing update condition may be present when a signal strength from network node 121 greater than TADD, or perhaps TADD+X, is detected or if a threshold number of signal strength bars are detected, such as detecting three or more bars. In another example, processing unit 103 may determine that a resource-efficient routing update condition is present when remote unit 101 is in a coverage area in which access classes of a lowest tier of access classes are allowed. This lowest tier may simply include the access class that is associated with the lowest priority or most deferrable application data. In another example, processing unit 103 may determine that a resource-efficient routing update condition is present when the loading level of network node 121 is below a threshold loading level, such as 80% loaded.

Thus, returning to diagram 300 for some illustration, remote unit 101 may determine that it is within the edge portion of its routing area and in sector 313. Depending on the embodiment, remote unit 101 may perform a routing area update at this time rather than waiting until it crosses outside of circle 303 if it is detecting a sufficient signal strength from the network node of sector 313, if the network node allows access classes of a lowest tier of access classes, and/or if the network node is not too heavily loaded. If instead remote unit 101 determines that a resource-efficient routing update condition not present, it may continue monitoring for a resource-efficient opportunity while within sector 313 and as it perhaps moves into other sectors such as 312, 314, 315, or 317.

In still additional embodiments, further optimizations may be made to determining when to perform a routing area update. For example, when remote unit 101 is determined to be within the edge portion or determined to be within the end portion of its routing area update interval and when at least one condition is present to perform a resource-efficient routing update, it may still be advantageous for remote unit 101 to seek an even better opportunity for performing a routing area update. Thus, processing unit 103 may monitor for a secondary condition to be present in addition to the resource-efficient conditions already described before performing a routing area update.

For example, processing unit 103 may wait for an opportunity when an increased signal strength or an increased number of signal strength bars is received from the network node before performing a routing area update if any one or more (embodiment dependent, of course) of the following conditions are present: remote unit 101 is moving at a below-threshold velocity, a paging interval for remote unit 101 has a below-threshold period, remote unit 101 has only moved a below-threshold distance within the edge portion of the routing area, or a greater signal strength is anticipated for remote unit 101 while within the edge portion of the routing area.

Thus, returning to diagram 300 for some illustration, remote unit 101 may determine that it is within the edge portion of its routing area and in sector 313 again. If remote unit 101 is stationary or moving relatively slowly or has only moved a relatively short distance within the edge portion, it will likely remain in the edge portion for awhile longer. Thus, since a routing area update is not required and it may not be required for awhile, remote unit 101 waits until it detects an increased signal strength (perhaps TADD+2X) or more bars (perhaps five bars) before performing a routing area update. On the other hand, if remote unit 101 begins to move at a higher velocity or has moved a substantial distance within the edge portion of the routing area, it may proceed with a routing area update so long as a resource-efficient condition is still present. Additionally or alternatively, if remote unit 101 anticipates (perhaps based on signaling from the network node) that one of the other sectors (sectors 310-312 or 314-318, for example) will have a greater signal strength (perhaps based on a present direction of travel), remote unit 101 may wait until it detects this greater signal strength before performing a routing area update.

As described above remote unit 101 may determine whether it is within the edge portion of its routing area. Again depending on the embodiment, the remote unit may employ any of a variety of techniques to make this determination. For example, processing unit 103 may receive signaling, from network node 121 via transceiver 105, that indicates that a coverage area of network node 121 is part of an edge portion of the routing area, or processing unit 103 may determine that remote unit 101 has traveled more than a predetermined portion of a routing area update distance (e.g., more than 80% of its routing area update distance) since last performing a routing area update. In embodiments in which network nodes provide signaling to indicate edge nodes, numerous signaling possibilities exist. For example, network nodes may identify themselves or other nodes as being within a edge portion of a routing area via overhead messaging, via a retry order, and/or via a response to a previous routing area update. Thus, remote unit 101 may determine that it is within an edge portion of its routing area by its own means or based on signaling from one or more network nodes.

Benefits, other advantages, and solutions to problems have been described above with regard to specific embodiments of the present invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

As used herein and in the appended claims, the term "comprises," "comprising," or any other variation thereof is intended to refer to a non-exclusive inclusion, such that a process, method, article of manufacture, or apparatus that comprises a list of elements does not include only those elements in the list, but may include other elements not expressly listed or inherent to such process, method, article of manufacture, or apparatus. The terms a or an, as used herein, are defined as one or more than one. The term plurality, as used herein, is defined as two or more than two. The term another, as used herein, is defined as at least a second or more. Unless otherwise indicated herein, the use of relational terms, if any, such as first and second, and the like, are used solely to distinguish one entity or action from another entity or action without necessarily requiring or implying any actual such relationship or order between such entities or actions.

The terms including and/or having, as used herein, are defined as comprising (i.e., open language). The term coupled, as used herein, is defined as connected, although not necessarily directly, and not necessarily mechanically. Terminology derived from the word "indicating" (e.g., "indicates" and "indication") is intended to encompass all the various techniques available for communicating or referencing the information or object being indicated. Some, but not all examples of techniques available for communicating or referencing the information or object being indicated include the conveyance of the information or object being indicated, the conveyance of an identifier of the information or object being indicated, the conveyance of information used to generate the information or object being indicated, the conveyance of some part or portion of the information or object being indicated, the conveyance of some derivation of the information or object being indicated, and the conveyance of some symbol representing the information or object being indicated. The terms program, computer program, and computer instructions, as used herein, are defined as a sequence of instructions designed for execution on a computer system. This sequence of instructions may include, but is not limited to, a subroutine, a function, a procedure, an object method, an object implementation, an executable application, an applet, a servlet, a shared library/dynamic load library, a source code, an object code and/or an assembly code.

What is claimed is:

1. A method for performing routing area updates comprising:
   determining at least one of
      whether a remote unit is within an edge portion of a routing area or
      whether the remote unit is within an end portion of a routing area update interval;
   determining whether at least one condition is present for the remote unit to perform a resource-efficient routing area update; and
   when at least one of the remote unit is determined to be within the edge portion or the remote unit is determined to be within the end portion and when the at least one condition is present, performing a routing area update, wherein determining whether the at least one condition is present for the remote unit to perform a resource-efficient routing area update comprises at least one of
   receiving signaling from a network node having a signal strength greater than a threshold signal strength value,
   determining that the remote unit detects a threshold number of signal strength bars,
   determining that the remote unit is in a coverage area in which access classes of a lowest tier of access classes are allowed, or
   determining that a loading level of a network node is below a threshold loading level.

2. The method of claim 1, wherein determining whether the remote unit is within an edge portion of the routing area comprises at least one of
   receiving signaling from a network node that indicates that a coverage area of the network node is part of an edge portion of the routing area, or
   determining that the remote unit has traveled more than a predetermined portion of a routing area update distance since last performing a routing area update.

3. The method of claim 2, wherein receiving signaling from the network node that indicates that a coverage area of the network node is part of an edge portion of the routing area comprises
   receiving at least one of overhead messaging, a retry order, or a response to a previous routing area update.

4. The method of claim 1, wherein the threshold signal strength value is a value equivalent to one of
   a predetermined threshold signal strength value or
   the predetermined threshold signal strength value plus an additional signal strength amount.

5. The method of claim 1, wherein at least one of an increased threshold signal strength value or an increased threshold number of signal strength bars is used when at least one secondary condition is present, wherein the at least one secondary condition comprises at least one of
   the remote unit is moving at a below-threshold velocity,
   a paging interval for the remote unit has a below-threshold period,
   the remote unit has only moved a below-threshold distance within the edge portion of the routing area, or
   a greater signal strength is anticipated for the remote unit while within the edge portion of the routing area.

6. A communication device for performing routing area updates, the communication device comprising:
   a transceiver;
   a processing unit, communicatively coupled to the transceiver,
      adapted to determine at least one of
         whether a remote unit is within an edge portion of a routing area or
         whether the remote unit is within an end portion of a routing area update interval,
      adapted to determine whether at least one condition is present for the remote unit to perform a resource-efficient routing area update, and
      adapted to perform a routing area update, via the transceiver, when the at least one condition is present and when at least one of
         the remote unit is determined to be within the edge portion or
         the remote unit is determined to be within the end portion,
      wherein being adapted to determine whether the at least one condition is present for the remote unit to perform a resource-efficient routing area update comprises at least one of
         being adapted to receive signaling, from a network node via the transceiver, having a signal strength greater than a threshold signal strength value,
         being adapted to determine that the remote unit detects a threshold number of signal strength bars,
         being adapted to determine that the remote unit is in a coverage area in which access classes of a lowest tier of access classes are allowed, or
         being adapted to determine that a loading level of a network node is below a threshold loading level.

7. The communication device of claim 6, wherein being adapted to determine whether the remote unit is within an edge portion of the routing area comprises at least one of
   being adapted to receive signaling, from a network node via the transceiver, that indicates that a coverage area of the network node is part of an edge portion of the routing area, or
   being adapted to determine that the remote unit has traveled more than a predetermined portion of a routing area update distance since last performing a routing area update.

8. The communication device of claim 7, wherein being adapted to receive signaling from the network node that indicates that a coverage area of the network node is part of an edge portion of the routing area comprises
   being adapted to receive at least one of overhead messaging, a retry order, or a response to a previous routing area update.

9. The communication device of claim 6, wherein the threshold signal strength value is a value equivalent to one of
   a predetermined threshold signal strength value or
   the predetermined threshold signal strength value plus an additional signal strength amount.

10. The communication device of claim 6, wherein at least one of an increased threshold signal strength value or an increased threshold number of signal strength bars is used when at least one secondary condition is present, wherein the at least one secondary condition comprises at least one of
   the remote unit is moving at a below-threshold velocity,
   a paging interval for the remote unit has a below-threshold period,
   the remote unit has only moved a below-threshold distance within the edge portion of the routing area, or
   a greater signal strength is anticipated for the remote unit while within the edge portion of the routing area.

* * * * *